United States Patent
Paramasivam et al.

(10) Patent No.: US 9,848,047 B2
(45) Date of Patent: **\*Dec. 19, 2017**

(54) HIGH DENSITY HOSTING FOR MESSAGING SERVICE

(71) Applicant: Microsoft Technology Licensing, LLC, Redmond, WA (US)

(72) Inventors: Kartik Paramasivam, Redmond, WA (US); Sung Hwa Jin, Bellevue, WA (US); Manu Srivastava, Redmond, WA (US); Muralidhar Krishnaprasad, Redmond, WA (US); Ruppert Rolf Koch, Redmond, WA (US); Venkata Raja Gopal Ravipati, Bellevue, WA (US); Bin Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,385

(22) Filed: Apr. 19, 2016

(65) Prior Publication Data

US 2016/0330282 A1 Nov. 10, 2016

Related U.S. Application Data

(63) Continuation of application No. 13/419,435, filed on Mar. 14, 2012, now Pat. No. 9,344,391.

(51) Int. Cl.
*H04L 29/08* (2006.01)
*H04L 12/58* (2006.01)
(Continued)

(52) U.S. Cl.
CPC ........ *H04L 67/1097* (2013.01); *G06F 9/5088* (2013.01); *G06F 9/546* (2013.01);
(Continued)

(58) Field of Classification Search
CPC ......... H04L 51/14; H04L 51/34; H04L 67/06; H04L 67/1002; H04L 67/1097;
(Continued)

(56) References Cited

U.S. PATENT DOCUMENTS

| 7,047,294 B2 | 5/2006 | Johnson et al. |
| 7,680,900 B2 | 3/2010 | Duigenan et al. |

(Continued)

OTHER PUBLICATIONS

"Final Office Action Issued in U.S. Appl. No. 13/419,435", dated Oct. 21, 2014, 7 pages.
(Continued)

*Primary Examiner* — Michael C Lai
(74) *Attorney, Agent, or Firm* — Liang IP, PLLC (57) ABSTRACT

Aspects of the subject matter described herein relate migrating message for a messaging service. In aspects, a determination is made that messages need to be migrated based on a threshold being crossed. In response, an agent is instructed to migrate data associated with the messages to another location. The agent uses various factors to determine one or more queues to migrate. While a queue is being migrated, during a first portion of the migration, messages may be added to and removed from the queue as senders send new messages and receivers consume messages. During a second portion of the migration, the queue is frozen to disallow the queue to be used for receiving new messages and delivering queued messages. The migration may be orchestrated to attempt to achieve certain goals.

20 Claims, 5 Drawing Sheets

(51) Int. Cl.
*G06F 9/50* (2006.01)
*G06F 9/54* (2006.01)

(52) U.S. Cl.
CPC .............. *H04L 51/14* (2013.01); *H04L 51/34* (2013.01); *H04L 67/06* (2013.01); *H04L 67/1002* (2013.01); *H04L 67/148* (2013.01); *G06F 2209/5022* (2013.01); *G06F 2209/548* (2013.01)

(58) Field of Classification Search
CPC ........... H04L 67/148; G06F 2209/5022; G06F 2209/548; G06F 9/5088; G06F 9/546
USPC .......................................................... 709/217
See application file for complete search history.

(56) References Cited

U.S. PATENT DOCUMENTS

| | | | |
|---|---|---|---|
| 2003/0110232 A1* | 6/2003 | Chen .................. | H04L 67/1002 709/212 |
| 2003/0115317 A1 | 6/2003 | Hickson et al. | |
| 2003/0120720 A1 | 6/2003 | Montero | |
| 2004/0078438 A1* | 4/2004 | Pyle ........................ | H04L 51/14 709/206 |
| 2005/0278410 A1 | 12/2005 | Espino | |
| 2006/0059228 A1* | 3/2006 | Kasamsetty .......... | G06F 9/5088 709/203 |
| 2006/0212671 A1* | 9/2006 | Todd ...................... | G06F 3/061 711/165 |
| 2006/0277317 A1 | 12/2006 | Clark et al. | |
| 2007/0013948 A1 | 1/2007 | Bevan | |
| 2007/0067389 A1 | 3/2007 | Bedi et al. | |
| 2008/0059597 A1 | 3/2008 | Blevins et al. | |
| 2008/0244696 A1 | 10/2008 | Bhola et al. | |
| 2009/0049056 A1 | 2/2009 | Shutt et al. | |
| 2009/0063667 A1 | 3/2009 | Smith et al. | |
| 2009/0133038 A1 | 5/2009 | Chkodrov et al. | |
| 2009/0133039 A1 | 5/2009 | Chkodrov et al. | |
| 2009/0172336 A1 | 7/2009 | Schmidt | |
| 2009/0187632 A1* | 7/2009 | Alarid .................. | G06Q 10/107 709/206 |
| 2010/0093441 A1 | 4/2010 | Rajaraman et al. | |
| 2010/0121923 A1 | 5/2010 | Cvetkovic et al. | |
| 2010/0131554 A1 | 5/2010 | Cooper | |
| 2010/0211548 A1 | 8/2010 | Ott et al. | |
| 2010/0235495 A1 | 9/2010 | Petersen et al. | |
| 2010/0333111 A1 | 12/2010 | Kothamasu et al. | |
| 2011/0119307 A1 | 5/2011 | Unger et al. | |
| 2012/0047264 A1* | 2/2012 | Parthasarathy ......... | H04L 51/14 709/226 |
| 2013/0055288 A1 | 2/2013 | Jonnagadla et al. | |

OTHER PUBLICATIONS

"Non Final Office Action Issued in U.S. Appl. No. 13/419,435", dated May 20, 2014, 12 pages.
"Notice of Allowance Issued in U.S. Appl. No. 13/419,435", dated Jan. 11, 2016, 8 pages.
"Notice of Allowance Issued in U.S. Appl. No. 13/419,435", dated Mar. 24, 2016, 2 Pages
"Notice of Allowance Issued in U.S. Appl. No. 13/419,435", dated Feb. 17, 2015, 8 pages.
"Notice of Allowance Issued in U.S. Appl. No. 13/419,435", dated Jun. 22, 2015, 7 pages.
"Notice of Allowance Issued in U.S. Appl. No. 13/419,435", dated Sep. 15, 2015, 13 Pages.
"Final Office Action Issued in U.S. Appl. No. 13/420,620", dated Jan. 2, 2015, 11 Pages.
"Non Final Office Action Issued in U.S. Appl. No. 13/420,620", dated Nov. 22, 2013, 9 Pages.
"Non Final Office Action Issued in U.S. Appl. No. 13/420,620", dated Sep. 24, 2015, 14 pages.
"Supplementary Search Report Issued in European Patent Application No. 13760728.9", dated Nov. 2, 2015, 8 Pages.
"First Office Action and Search Report Issued in Chinese Patent Application No. 201310080434.2", dated Jul. 3, 2015, 16 Pages.
"Notice of Allowance Issued in Chinese Patent Application No. 201310080434.2", dated Jun. 28, 2016, 5 Pages.
"Second Office Action Issued in Chinese Patent Application No. 201310080434.2", dated Mar. 8, 2016, 7 Pages.
Du, et al., "Highly Available Component Sharing in Large-Scale Multi-Tenant Cloud Systems", In Proceedings of the 19th ACM International Symposium on High Performance Distributed Computing, Jun. 21, 2010, 9 pages.
Kreps, et al., "Kafka: a Distributed Messaging System for Log Processing", In Proceedings of 6th International Workshop on Networking Meets Databases (NetDB), Co-located with SIGMOD 2011, Jun. 12, 2011, 7 pages.
Kurmus, et al., "A Comparison of Secure Multi-tenancy Architectures for Filesystem Storage Clouds", In Proceedings of the 12th ACM/IFIP/USENIX international conference on Middleware, Dec. 12, 2011, 20 Pages.
"International Search Report and Written Opinion Issued in PCT Application No. PCT/US2013/027833", dated Jun. 26, 2013, 10 Pages.
Pervez, et al., "Multi-Tenant, Secure, Load Disseminated SaaS Architecture", In 12th International Conference on Advanced Communication Technology (ICACT), vol. 1, Feb. 7, 2010, 6 Pages.

* cited by examiner

HIGH DENSITY HOSTING FOR MESSAGING SERVICE

CROSS-REFERENCE TO RELATED APPLICATION(S)

This application is a continuation of and claims priority to U.S. patent application Ser. No. 13/419,435, filed on Mar. 14, 2012, now U.S. Pat. No. 9,344,391, issued on May 17, 2016, the disclosure of which is incorporated herein in its entirety.

BACKGROUND

The past several decades has seen a phenomenal growth in capabilities of computers. A typical computer of today often has many times the processing capabilities and storage capabilities as a typical computer of a decade ago. Even with the phenomenal increase in processing and storage capabilities, an inefficient algorithm compounded by many parallel requests may cause performance issues. While obtaining a faster computer or more computers may address the performance issues, such solutions may be expensive to purchase, power, and maintain.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate migrating message for a messaging service. In aspects, a determination is made that messages need to be migrated based on a threshold being crossed. In response, an agent is instructed to migrate data associated with the messages to another location. The agent uses various factors to determine one or more queues to migrate. While a queue is being migrated, during a first portion of the migration, messages may be added to and removed from the queue as senders send new messages and receivers consume messages. During a second portion of the migration, the queue is frozen to disallow the queue to be used for receiving new messages and delivering queued messages. The migration may be orchestrated to attempt to achieve certain goals.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
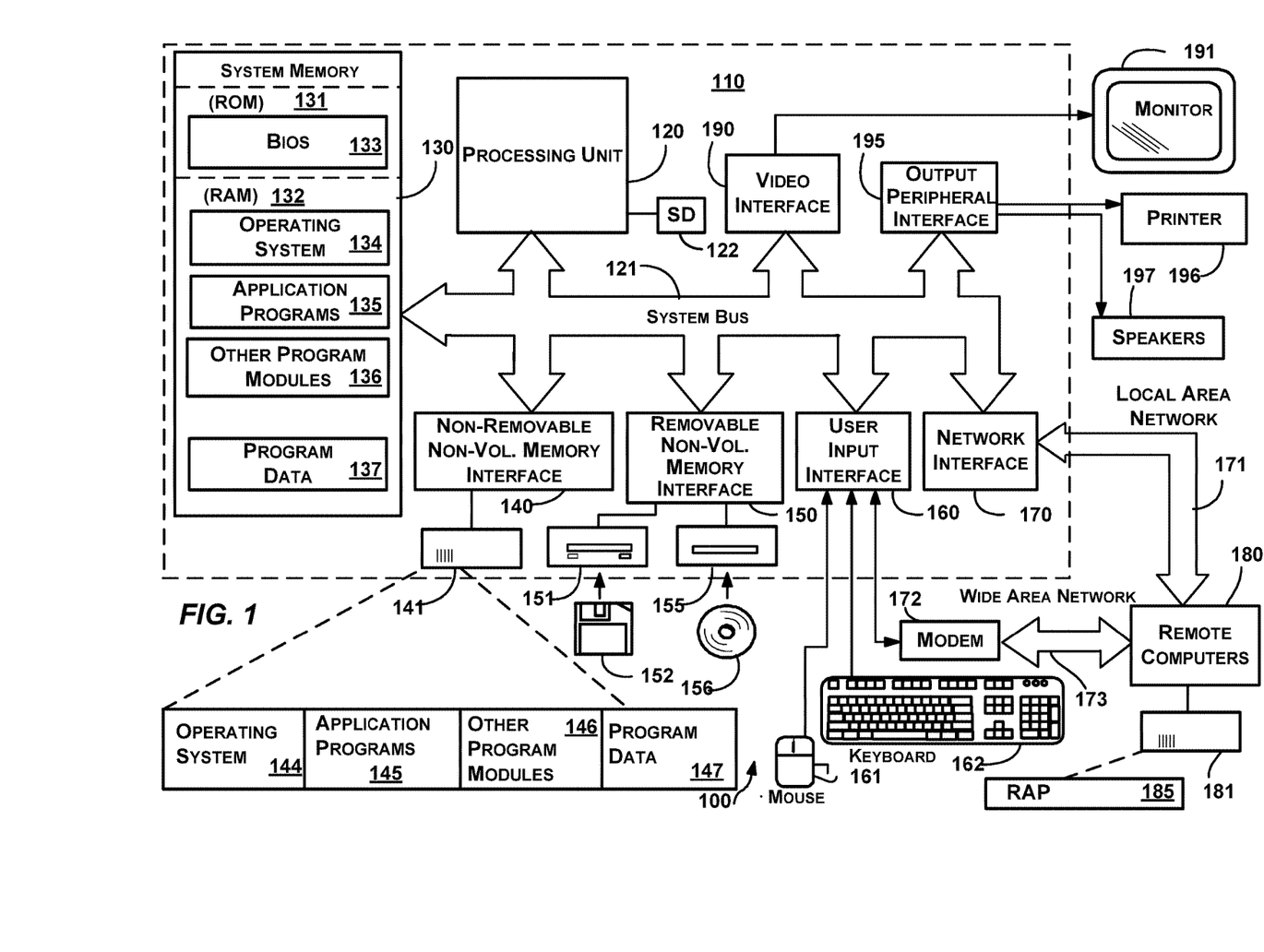
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone for inputting voice or other audio, joystick, game pad, satellite dish, scanner, a touch-sensitive screen, a writing tablet, a camera for inputting gestures or other visual input, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Migration

Figure 2:
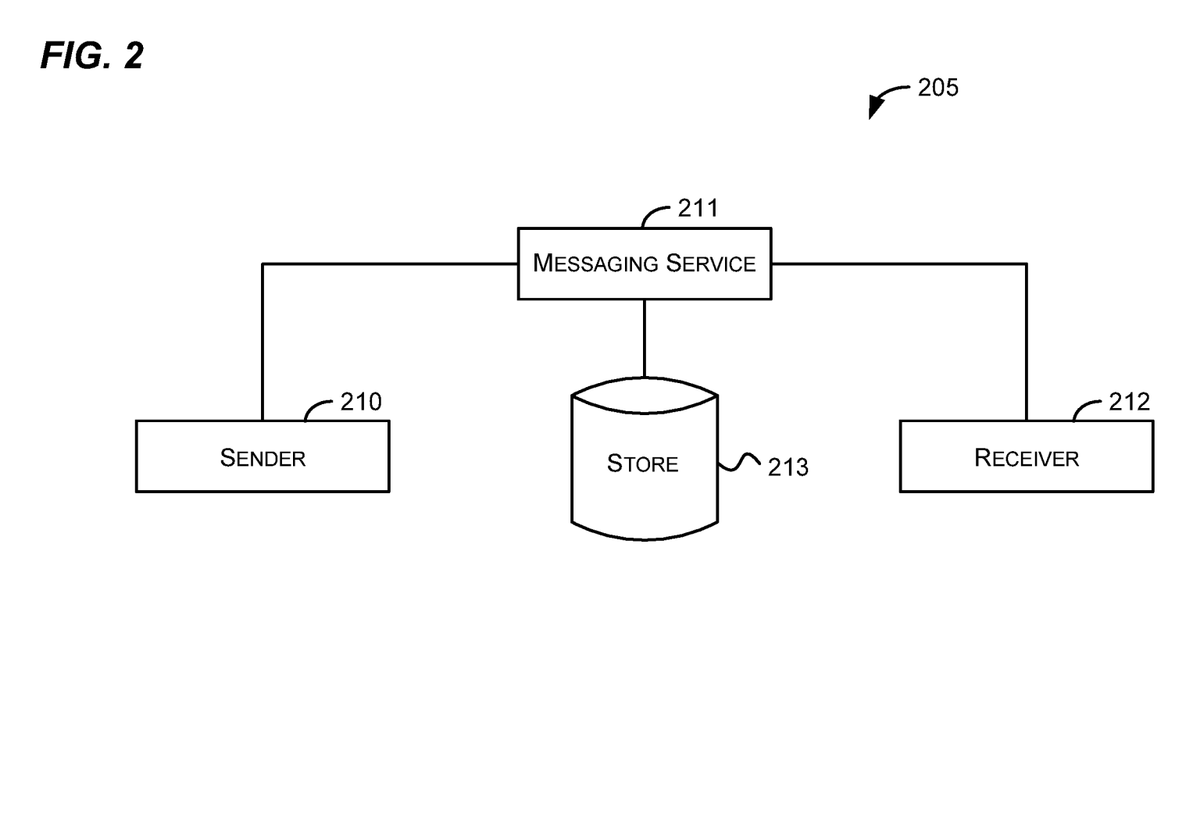
FIG. 2 is a block diagram that represents an exemplary environment in which aspects of the subject matter described herein may operate.
Figure 3:
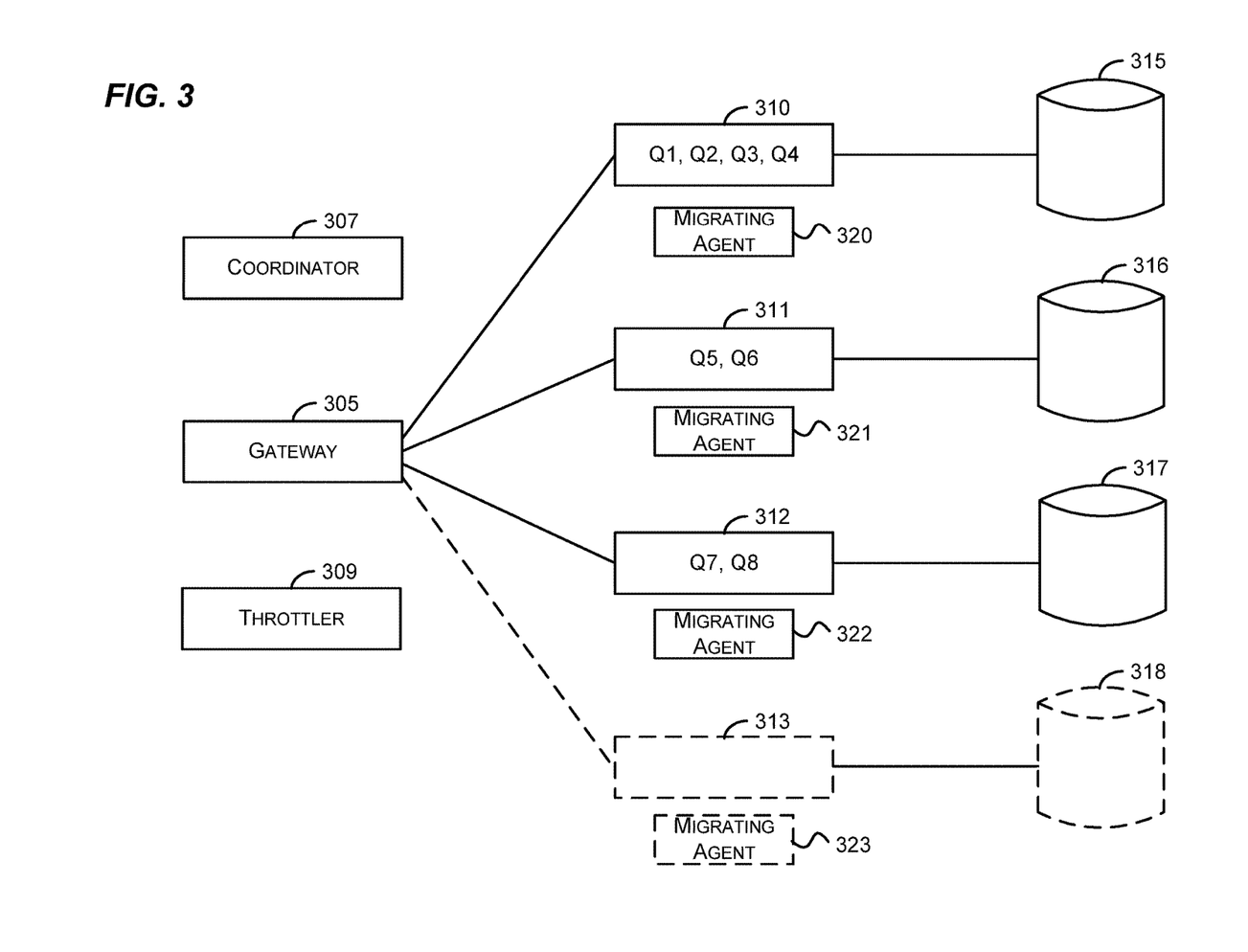
FIG. 3 is a block diagram representing an exemplary messaging service and associated data stores in accordance with aspects of the subject matter described herein.

As mentioned previously, addressing issues of performance by purchasing, powering, and maintaining computer resources may be costly. FIGS. 2-3 are block diagrams representing an exemplary arrangement of components in which aspects of the subject matter described herein may operate. The components illustrated in FIGS. 2-3 are exemplary and are not meant to be all-inclusive of components that may be needed or included. In other embodiments, the components and/or functions described in conjunction with FIG. 2-3 may be included in other components (shown or not shown) or placed in subcomponents without departing from the spirit or scope of aspects of the subject matter described herein. In some embodiments, the components and/or functions described in conjunction with FIG. 2-3 may be distributed across multiple devices.

FIG. 2 is a block diagram that represents an exemplary environment in which aspects of the subject matter described herein may operate. Turning to FIG. 2, the system 205 may include various components that may be one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the system 205 comprises a single device, an exemplary device that may be configured to act as the system 205 comprises the computer 110 of FIG. 1. Where the system 205 comprises multiple devices, each of the multiple devices may comprise one or more similarly or differently configured computers such as the computer 110 of FIG. 1.

The components of the system 205 may include a sender 210, a messaging service 211, a receiver 212, a store 213, and other components (not shown). As used herein, the term component is to be read to include all or a portion of one or more devices, a collection of one or more software modules or portions thereof, some combination of one or more software modules or portions thereof and one or more devices or portions thereof, and the like.

The various components of the system 205 may be located close to each other or even on the same machine or may be distributed across the world. The various components may communicate with each other via one or more local area networks, wide area networks, direct connections, virtual connections, private networks, virtual private networks, the Internet, some combination of the above, and the like.

The store 213 is any storage media capable of providing access to data. Access as used herein may include reading data, writing data, deleting data, updating data, a combination including two or more of the above, and the like. The store 213 may comprise hard disk storage, other non-volatile storage, volatile memory such as RAM, other storage, some combination of the above, and the like and may be distributed across multiple devices. The store 213 may be external, internal, or include components that are both internal and external to the system 205.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The sender 210 may send messages to the receiver 212 by sending the messages to the messaging service 211. Although only one sender is shown in FIG. 2, it is to be understood that there may be a plurality of different senders that send messages to the messaging service 211 for delivery to the receiver 212.

Likewise, although only one receiver 212 is shown in FIG. 2, in other embodiments, there may be a plurality of receivers receiving messages from the messaging service 211.

The messaging service 211 may store messages in the store 213 until the messages are delivered to the receiver 212. In one implementation, the messaging service 211 may notify the receiver 212 that there are messages for the receiver 212. In another implementation, the messaging service 211 may not proactively inform the receiver 212 of queued messages but may instead wait for the receiver 212 to ask the messaging service 211 whether there are any messages queued for the receiver 212.

In one implementation, the receiver 212 may receive notification that there are messages for the receiver 212. In another implementation, the receiver 212 may periodically check with the messaging service 211 to determine whether there are any messages for the receiver 212.

If there are messages queued for the receiver 212, the receiver 212 may obtain the messages from the messaging service 211 and act on the messages as appropriate.

FIG. 3 is a block diagram representing an exemplary messaging service and associated data stores in accordance with aspects of the subject matter described herein. The messaging service may include a gateway 305, a coordinator 307, a throttler 309, message containers 310-312, and other components (not shown). Each message container may be associated with a store (e.g., the stores 315-317) that may include one or more queue objects.

A queue object may include a queue of messages to deliver to a single receiver, a queue of messages where there may be two or more receivers competing for and consuming the messages, a topic, another durable object stored on a store, a combination of two or more of the above, and the like. Where two or more receivers compete for messages of a queue, once one of the receivers has consumed a message from the queue, the message is no longer available for the other receivers to consume.

A topic may include a queue of messages that may, though the use of filters, be used to logically create multiple sub queues. A sub queue may be associated with one or more filters. Each filter may use various criteria to determine whether a message in the topic is to be logically placed within a sub queue associated with the filter. In one implementation, the sub queues may be implemented by storing pointers or other identifiers that reference the messages of the topic.

A sub queue may be subscribed to by one or more receivers. If a sub queue is subscribed to by a single receiver, that single receiver is allowed to consume the messages of the sub queue. If the sub queue is subscribed to by multiple receivers, the multiple receivers compete for and consume the messages of the sub queue.

As used herein, a queue object will sometimes be referred to simply as a queue. Unless the context indicates otherwise, it is to be understood that as used herein, a queue is a shortened name for a queue object.

When the space consumed in a store associated with a message container crosses a configurable threshold this may trigger migrating one or more of the queues in the message container to another message container with its associated store. For example, if the message container 310 exceeds 70% of the storage capacity of the store 315, one or more of the queues of the message container 310 may be migrated to the message container 313 and its associated store 318.

The coordinator 307 may monitor the use of storage on the stores of the messaging service. If the storage usage passes a threshold, and if an additional message container is needed, the coordinator 307 may instantiate a new message container (e.g., the message container 313) and associate the new message container with one or more stores (e.g., the store 318). A store may be associated with one or more message containers. The coordinator 307 may then cause queues to be migrated from messaging containers that have crossed a threshold.

Data that indicates that the coordinator 307 decided to migrate a queue may be persisted in a nonvolatile store for crash recovery, for example. Furthermore, data that indicates that a queue has been moved may be persisted for a configurable period of time to allow, for example, the restoring of messages from a backup that occurred prior to moving the queue.

Throughput may be another trigger for moving queues from one messaging container to another. For example, if a messaging container has one or more hot queues that receive messages at a high rate, the messaging container may be overwhelmed and perform sluggishly. The coordinator 307 may monitor throughput of the messaging containers and may instruct messaging containers that have throughput below a threshold to migrate data to other messaging containers.

The triggers described above are exemplary. There may be other criteria that the coordinator 307 may monitor to determine whether queues need be migrated without departing from the spirit or scope of aspects of the subject matter described herein.

The term messaging container refers to a component that receives messages from one or more senders and provides these messages to one or more receivers. There may be intermediate components between a messaging container and its sender(s) and receiver(s). Based on the order in which messages are received, a messaging container may place the messages received into a queue and may use storage internal and/or external to the messaging container to store the queue. The storage may be volatile and/or nonvolatile and may be implemented by any type or combination of storage mediums mentioned herein.

To cause queues to be migrated, the coordinator 307 may instruct a messaging container that has crossed a threshold to move a portion of its queues to one or more other messaging containers identified by the coordinator 307. The one or more other messaging containers may include one or more of: a newly instantiated messaging container (e.g, the messaging container 313), an existing messaging container (e.g., one that has capacity for more queues), a plurality of newly instantiated messaging containers, a plurality of existing messaging containers, a combination of two or more of the above, or the like. Furthermore, multiple queues from one or more messaging containers may be migrated in parallel.

In response, the messaging container may determine which of its queues to move. Each messaging container may include a migration agent that handles migrating data to one or more other messaging containers. For example, the messaging containers 310-313 may include the migrating agents 320-323, respectively. In selecting queues to migrate, a migration agent may attempt to meet several goals including one or more of minimizing downtime of a queue, minimizing time to accomplish the migration, freeing up enough space to satisfy the coordinator 307, and the like. The migration agent may determine which queues to move based one or more of the following exemplary factors:

1. When the queue was last used;

2. Queue size. This may be measured by space used to store the queue, number of messages in the queue, or the like;

3. How frequently a queue is used. This is sometimes referred to as "hotness." In one example, hotness may be measured by average throughput over time where more recent usages are weighted more; and 4. Queue type. For example, whether the queue is a queue of messages, a topic, or another type of object may be used as a factor.

In one implementation, a migration agent will first determine the times that the queues were last used. If only one queue has the longest time since being last used, that queue may be selected for migration. If multiple queues have the same longest time since being last used, the migration agent may then look at queue size in terms of space used on the store. If one of the queues is larger than all the other queues, this queue may be chosen for migration. If two or more queues both share the largest size, the queue that is least hot may be selected for migration.

In one example, a migration agent may sort queues of a messaging container by the three criteria mentioned above and begin migrating queues based on the sorted order until enough space has been freed to satisfy the coordinator 307.

In another implementation, a migration agent may use a formula that weights each of the factors above. For example, an exemplary formula may include: $f(x)=w_1*$last used+$w_2*$queue size+$w_3*$hotness, where * represents multiplication and $w_1$, $w_2$, and $w_3$ represent weights. The migration agent may sort the queues based on this formula and may begin migrating queues based on the sorted order until enough space has been freed to satisfy the coordinator 307.

In one implementation, the migrating agent may migrate data for one or more of its queues by performing a set of actions. The set of actions may include, for example:

1. Determining a queue to migrate based on one or more factors (e.g., the factors mentioned above).

2. Migrating data of the queue while allowing the queue to be used for receiving new messages and delivering queued messages.

3. Repeating step 2 until the remaining data in the queue is below a threshold. The threshold may be selected to cause the queue to be frozen for less than a configurable period of time.

4. Freezing the queue to disallow the queue to be used for receiving new messages and delivering queued messages.

5. Migrating remaining data, if any, of the queue while the queue is frozen.

6. Updating data structures of the gateway to indicate that the migrated to messaging container is to be used for the queue.

7. Thawing the queue. Thawing allows the queue to be used for receiving new messages and delivering queued messages.

8. Updating data structures that indicate that the queue has been migrated.

9. Repeating the steps above, if needed, to free additional space.

If an error occurs, the queue may be thawed without instruction of the migrating agent. Upon restart, the migrating agent may:

1. Detect that it had not completed migrating data of the queue. If the migrating agent detects this, the migrating agent may restart at step 2 above.

2. Detect that it had completed migrating data but that step 6 above had not been performed. If the migrating agent detects this, it is possible that more messages have been added to the old queue. Thus, the migrating agent may restart at step 2 above.

3. Detect that it had completed migrating data and that steps 2-7 had been completed but that step 8 had not been completed. If the migrating agent detects this, it may resume at step 8.

In migrating data, the migrating agent may detect that it is not copying data as fast as data is being inserted into the queue. In this case, the migrating agent may abort migrating the data of the queue, instruct the throttler 309 to reduce the rate at which messages are allowed to be delivered to the queue, or take other actions.

In one implementation, there may be a separate throttler for each messaging container. In another implementation, there may be a single throttler for the entire messaging service. The throttler 309 may control the rate at which messages are allowed to be added to a queue. By reducing the rate for a queue, the throttler 309 may assist a migrating agent that is attempting to migrate data of the queue to another messaging container.

Figure 4:
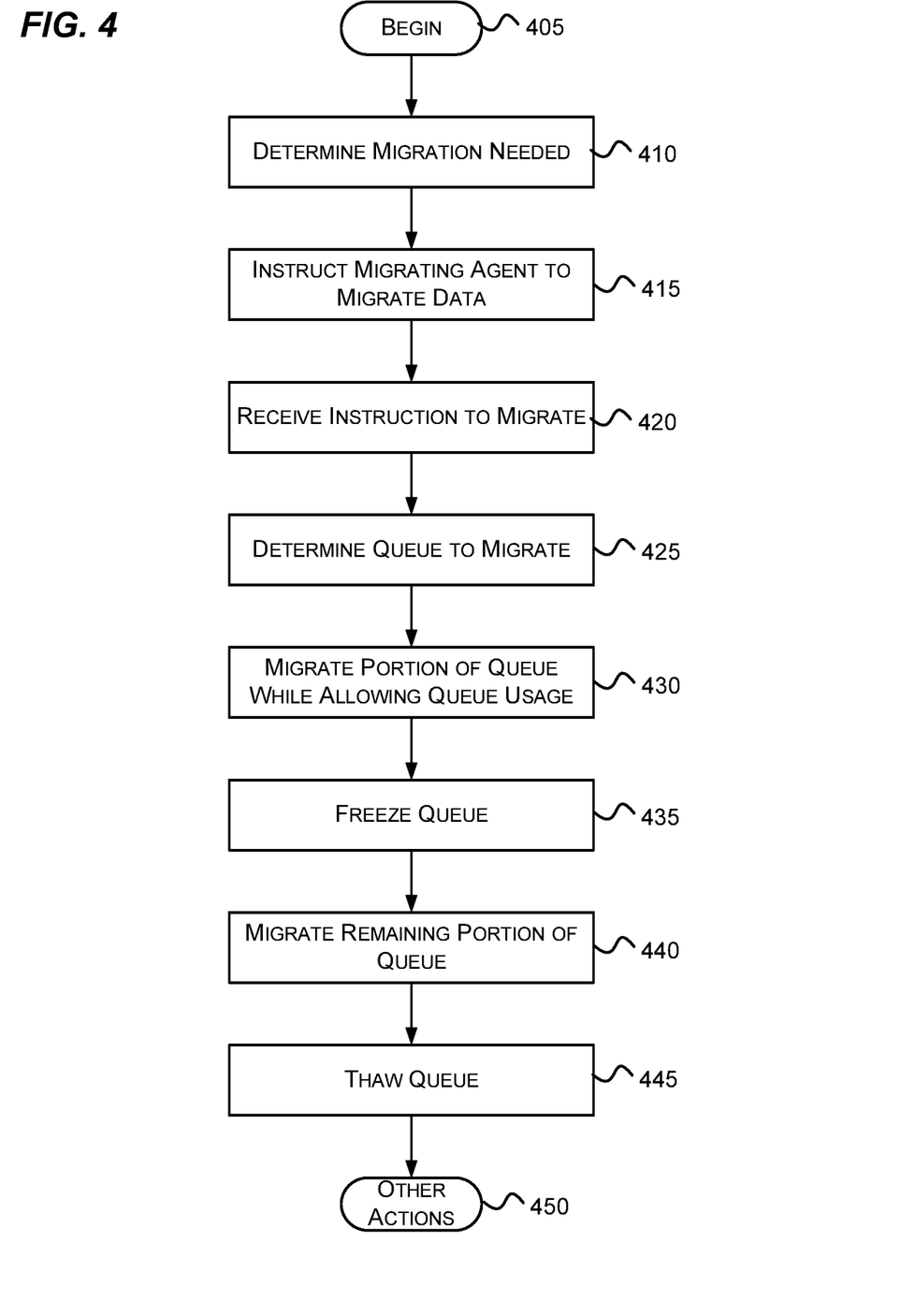
FIG. 4 is a block diagram that generally represents exemplary actions that may occur at a messaging service in accordance with aspects of the subject matter described herein.
Figure 5:
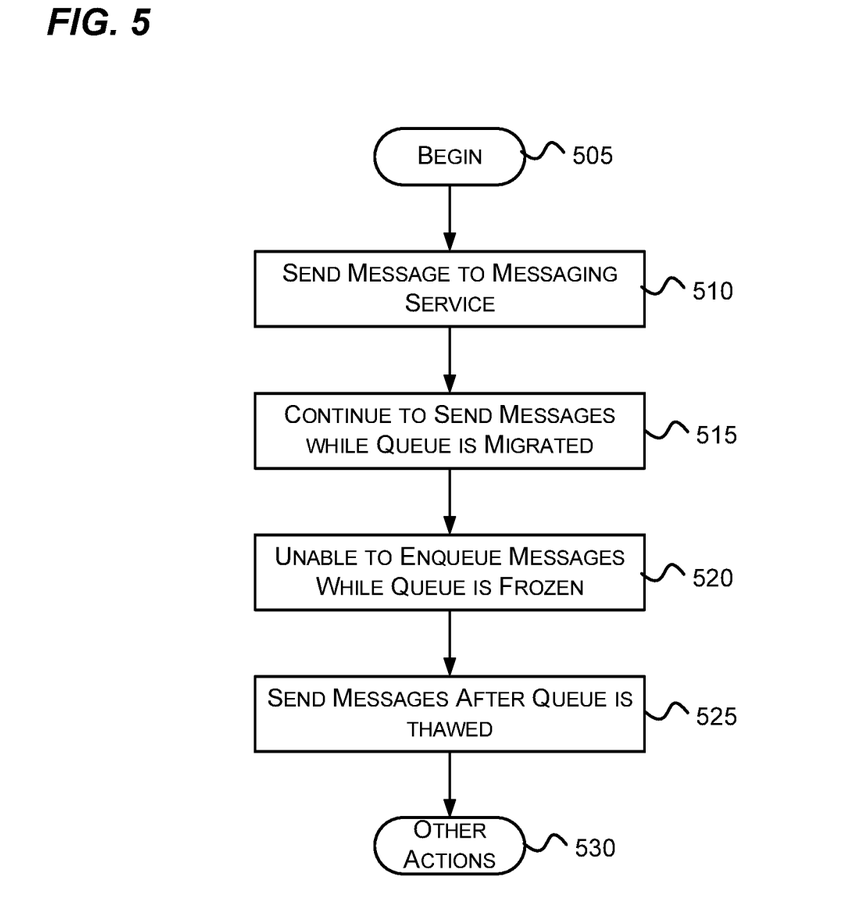
FIG. 5 is a block diagram that generally represents exemplary actions that may occur from a sender perspective in accordance with aspects of the subject matter described herein.

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Although some indications and are made as to which components are performing what actions, these indications are exemplary only. In other embodiments, actions described as being performed by one component may be performed by another component. For example, in some implementations, a coordinator may perform some of the actions that have been described as being performed by a migrating agent or messaging container and vice versa.

FIG. 4 is a block diagram that generally represents exemplary actions that may occur at a messaging service in accordance with aspects of the subject matter described herein. Turning to FIG. 4, at block 405, the actions begin. At block 410, a determination is made that migration is needed. For example, referring to FIG. 3, the coordinator 307 may determine that storage consumed for the messaging container 310 has exceeded a threshold. As another example, the coordinator 307 may determine that the transaction rate of the messaging container 310 has dropped below a threshold.

At block 415, a migrating agent may be instructed to move data to one or more other messaging containers. For example, referring to FIG. 1, the coordinator 307 may instantiate a new messaging container 313 and associate the messaging container 313 with the store 318. The coordinator 307 may then instruct the migrating agent 320 to migrate a specified amount (e.g., 100 GB) of data to the messaging container 310. In instructing the migrating agent 320 to migrate data to one or more other messaging containers, the coordinator 307 may instruct the migrating agent 320 as to an amount of data that is to be migrated to each messaging container.

At block 420, the messaging container receives the instruction to migrate data to at least one messaging container. For example, referring to FIG. 3, the messaging container 310 (e.g., via the migrating agent 320) may receive an instruction to migrate a specified amount (e.g., 100 GB) of data to the messaging container 313.

At block 425, a queue to migrate to another messaging container is determined. This determination may be based on one or more factors including when the queue was last used, size of the queue, and hotness of the queue as mentioned previously. For example, referring to FIG. 2, the migrating agent may select Q4 to migrate if Q4 was the queue that has not been used the longest.

In one exemplary implementation, the migrating agent may determine a queue to migrate by:
1. Placing identifiers of the queues into a sorted list by sorting the queues based on first when each queue was last used, second size of each queue, and third hotness of each queue; and
2. Selecting the queue associated with the first element of the list.

In another exemplary implementation, the migrating agent may determine a queue to migrate by:
1. Placing identifiers of the queues into a sorted list by sorting the queues based on a formula:

$$f(x) = w_1 * \text{last used} + w_2 * \text{queue size} + w_3 * \text{hotness},$$

where * represents multiplication and $w_1$, $w_2$, and $w_3$ represent weights; and
2. Selecting the queue associated with the first element of the list.

Based on the teachings herein, those skilled in the art will recognize other mechanisms for determining a queue based on various factors.

At block 430, at least a portion of the queue is migrated while allowing the queue to be used by the messaging container for receiving new messages and delivering queued messages. For example, referring to FIG. 2, the migrating agent 320 may begin copying data from the queue to the new messaging container 313. The migrating agent 320 may copy data from the queue until the remaining data of the queue is below a threshold or until other conditions occur.

For example, the migrating agent may determine whether the queue is growing faster than the queue is being migrated. If the queue is growing faster than the queue is being migrated, the migrating agent may abort migrating the queue.

As another example, if the migrating agent determines that the queue is growing faster than the queue is being migrated, the migrating agent may throttle the queue by decreasing a rate at which messages are allowed to be added to the queue.

Migrating the portion of the queue while allowing queue usage may involve copying a portion of the queue to the destination messaging container, detecting whether the remaining portion of the queue is less than a threshold, and repeating the actions above if and until the remaining portion of the queue is less than the threshold. Because the queue is allowed to receive messages, the remaining portion of the queue may be added to during the migrating activities of the migrating agent. If the remaining portion of the queue is less than the threshold, the actions of block 435 may be performed.

In migrating messages from a source messaging container to a destination messaging container, a migrating agent may also delete from the destination messaging container any messages that have been consumed from the queue during the migrating.

If a migrating agent repeatedly copies messages from a queue to a destination messaging container to prepare for freezing the queue, the migrating agent need only copy messages that have not already been previously copied from the queue to the destination messaging container.

At block 435, the queue may be frozen. For example, referring to FIG. 3, the migrating agent may freeze the queue Q4. Freezing the queue to disallow the queue to be used for receiving new messages and delivering queued messages.

At block 440, the remaining data in the queue, if any, may be migrated while the queue is frozen. For example, referring to FIG. 3, while the queue Q4 is frozen, the migrating agent 320 may migrate the remaining data, if any, of the queue Q4.

At block 445, the queue is thawed. For example, referring to FIG. 3, the migrating agent 320 may thaw the queue Q4 as all of the data has been migrated to the message container 313. Thawing allows the queue to be used for receiving new messages and delivering queued messages. Prior to thawing the queue, a data structure (e.g., one used by the gateway 305) may be updated to indicate that messages for Q4 are to be sent to the messaging container to which Q4 was migrated (e.g., the messaging container 313).

At block 450, other actions, if any, may be performed.

FIG. 5 is a block diagram that generally represents exemplary actions that may occur from a sender perspective in accordance with aspects of the subject matter described herein. At block 505, the actions begin.

At block 510, a message is sent to a messaging service. For example, referring to FIG. 2, the sender 210 sends a message to the messaging service 211 to be delivered to the receiver 212.

At block 515, messages may still be sent to the queue even while the queue is being migrated. For example, referring to FIG. 2, the sender 210 and other senders (not shown) may continue sending messages to a queue being migrated.

At block 520, while a queue is frozen, messages may not be added to the queue. For example, referring to FIG. 3, while the queue Q4 is frozen, no messages for the queue may be allowed to be added the queue. In one embodiment, a limited number of messages may be held outside the queue for a short time while the queue is frozen. After the queue is thawed, the held messages may be added to the queue.

At block 525, after the queue is thawed, the queue may be ready to receive messages again. For example, referring to FIG. 3, after the queue Q4 is migrated to the messaging container 313, the queue Q4 may receive and deliver messages as normal.

At block 530, other actions, if any, may be performed.

As can be seen from the foregoing detailed description, aspects have been described related to migrating messages. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented by a computer, the method comprising:
receiving an instruction to migrate data of messages in a queue from a first messaging container to a second messaging container;
in response to the received instruction, copying the data of the messages in the queue from the first messaging container to the second messaging container while allowing the queue to receive new messages and deliver queued messages from the first messaging container; and
when a remaining un-copied portion of the data of the messages in the queue in the first message container is less than a threshold, copying the remaining un-copied portion of the data of the messages in the queue from the first messaging container to the second messaging container while disallowing the queue to be used by the first messaging container for receiving any new messages and delivering any queued messages; and allowing the queue to be used by the second message container to receive new messages and deliver queued messages after the remaining un-copied portion of the data is copied from the first messaging container to the second messaging container.

2. The method of claim 1, further comprising:

determining whether a size of the queue is growing faster than that of the data being copied; and in response to determining that the size of the queue is growing faster than that of the data being copied, decreasing a rate at which any additional messages are allowed to be added to the queue.

3. The method of claim 1 wherein receiving the instruction includes receiving the instruction to migrate the data associated with the messages at the first messaging container after storage for the first messaging container exceeds a storage threshold.

4. The method of claim 1 wherein when the remaining un-copied portion of the queue is less than the threshold, copying the data of the messages in the queue to the second messaging container as a part of preparing for disallowing the queue to be used by the first messaging container for receiving additional messages and delivering previously received messages.

5. The method of claim 1, further comprising deleting, from the second messaging container, data of any messages consumed from the queue while the data is being copied from the first messaging container to the second messaging container.

6. The method of claim 1 wherein copying the data comprises copying the data of the messages that have not already been previously copied from the queue in the first messaging container to the second messaging container.

7. The method of claim 1, further comprising while the queue is disallowed to be used by the first messaging container for receiving additional messages and delivering queued messages, indicating that the second messaging container is to service the queue after copying the remaining un-copied portion of the data of the queue to the second messaging container is completed.

8. The method of claim 1, further comprising identifying the queue from a plurality of queues at the first messaging container based on at least one of when the queue was last used, a size of the queue, or an average throughput over time of the queue.

9. The method of claim 1 wherein receiving the instruction includes receiving the instruction as to an amount of the data of the messages that is to be migrated to the second messaging container.

10. The method of claim 1, further comprising selecting the queue from a plurality of queues in the first messaging container by sorting the plurality of queues based on at least one of (i) when each queue of the plurality of queues was last used, (ii) a size of each queue of the plurality of queues, or (iii) an average throughput over time of each queue of the plurality of queues.

11. A computing system, comprising:

a processor; and a memory coupled to the processor, the memory storing instructions, that when executed by the processor, cause the processor to perform a process comprising:

receiving an instruction to migrate data associated with messages in a queue from a source messaging container to a destination messaging container, in response to receiving the instruction, migrating the data of the messages in the queue from the source messaging container to the destination message container while allowing the queue to be used by the source messaging container for receiving new messages and delivering queued messages when a remaining portion of the data of the messages in the queue at the source messaging container is not below a threshold;

disallowing the queue to be used by the source messaging container for receiving new messages and delivering queued messages when the remaining portion of the data of the messages in the queue at the source messaging container is below the threshold; and allowing the queue to be used for receiving new messages and delivering the queued messages after the remaining portion of the data of the messages in the queue is migrated to the destination messaging container.

12. The computing system of claim 11 wherein the process further includes determine whether an amount of storage consumed by the source messaging container exceeds a threshold and providing the instruction to migrate at least a portion of the data associated with the source messaging container to the destination messaging container in response to determining that the amount of storage consumed by the source messaging container exceeds the threshold.

13. The computing system of claim 11 wherein the process further includes determining whether a size of the queue is growing faster than that of the data being migrated to the destination messaging container and in response to determining that the size of the queue is growing faster than that of the data being migrated, decreasing a rate at which messages are allowed to be added to the queue.

14. The computing system of claim 11 wherein the process further includes selecting the queue from a plurality of queues in the source messaging container based on one or more of when the queue was last used, a size of the queue, and an average throughput over time of the queue.

15. The computing system of claim 11 wherein migrating the data of the messages in the queue from the source messaging container to the destination message container includes:

copying a first portion of the queue to the destination messaging container;

detecting whether a remaining portion of the queue is greater than a threshold; and copying a second portion of the queue to the destination messaging container when the remaining portion is greater than the threshold.

16. The computing system of claim 11 wherein the process further includes while the queue is disallowed to be used for receiving new messages and delivering queued messages, updating a data structure to indicate that the destination messaging container is to service the queue after migrating of the remaining portion of the data.

17. A computer storage device storing computer-executable instructions, which when executed perform operations comprising:

copying data of messages in a queue associated with a first messaging container to a second messaging container while allowing the queue to be used by the first messaging container for receiving additional messages and delivering queued messages in the queue;

when a remaining un-copied portion of the data of the messages in the queue is less than a threshold, continue copying the remaining un-copied portion of the data of the messages in the queue from the first messaging container to the second messaging container while disallowing the queue to be used by the first messaging container for receiving any additional messages and delivering any queued messages; and allowing the queue to be used for receiving new messages and delivering queued messages after the remaining un-copied portion of the data is copied to the second messaging container.

18. The computer storage device of claim 17 wherein the operations further include:

determining whether a size of the queue is growing faster than a size of the data being copied; and in response to determining that the size of the queue is growing faster than the size of the data being copied, decreasing a rate at which any additional messages are allowed to be added to the queue.

19. The computer storage device of claim 17 wherein the operations further include while the queue is disallowed to be used by the first messaging container for receiving additional messages and delivering queued messages, indicating that the second messaging container is to service the queue after copying the remaining un-copied portion of the data of the queue to the second messaging container is completed.

20. The computer storage device of claim 17 wherein the operations further include identifying the queue from a plurality of queues at the first messaging container based on at least one of when the queue was last used, a size of the queue, or an average throughput over time of the queue.

* * * * *